Jan. 5, 1971  E. L. MORAGNE  3,553,641

VEHICLE THEFT ALARM AND CONTROL DEVICE

Filed Nov. 15, 1967

Edward L. Moragne
INVENTOR.

BY Carlos A. Torres

ATTORNEY

United States Patent Office 3,553,641
Patented Jan. 5, 1971

3,553,641
VEHICLE THEFT ALARM AND CONTROL DEVICE
Edward L. Moragne, 4723 Nenana,
Houston, Tex. 77035
Filed Nov. 15, 1967, Ser. No. 683,278
Int. Cl. B60r 25/04
U.S. Cl. 340—64  10 Claims

ABSTRACT OF THE DISCLOSURE

The trigger circuit of a silicon-controlled rectifier is manually introduced into the electrical system of an internal combustion engine by the first position of a two position switch so that closing of the ignition circuit provides a triggering pulse which biases the silicon-controlled rectifier into conduction to supply current to a horn. The resistance of the trigger circuit also prevents fuel ignition and the switch must be moved into its second position to permit ignition and to deenergize the horn.

BACKGROUND OF THE INVENTION (1) Field of the invention

The present invention relates to alarm devices and in particular to means for signaling the attempted theft of a vehicle and for preventing the engine of the vehicle from being started.

(2) Description of the prior art

The prior art includes various means for signaling the attempted theft of a vehicle. Many of these systems require elaborate circuitry and a great many components which often renders the system both expensive and impractical.

Some of the known devices merely signal an attempted theft but do nothing else to prevent the theft while still others attempt to prevent the theft without giving any alarm. Some of the prior art systems provide a warning signal when the ignition circuit is closed but allow the signal to stop merely by reopening the circuit. This may provide an opportunity for the thief to disable the alarm system before again closing the ignition and starting the engine.

SUMMARY OF THE INVENTION

The vehicle theft alarm of the present invention is an extremely dependable device which is inexpensive to manufacture and easily installed. The present invention sounds the horn of a vehicle anytime the ignition circuit of the vehicle is closed without first opening a concealed control switch. The initial closing of the control switch serves the dual purpose of introducing the resistance of a triggering circuit into the ignition system to prevent the engine from being started and connects a silicon-controlled rectifier between the vehicle battery and the horn. The closing of the ignition circuit with the control switch closed introduces a pulse in the trigger circuit of the rectifier to drive the rectifier into conduction and power the horn. The rectifier continues to conduct even after the ignition is reopened to act as a deterent to further attempts which may disable the warning system.

After being triggered, the battery voltage can be removed from the horn and the engine may be started only by opening the control switch.

DESCRIPTION OF THE PREFERRED EMBODIMENTS

Figure 1:
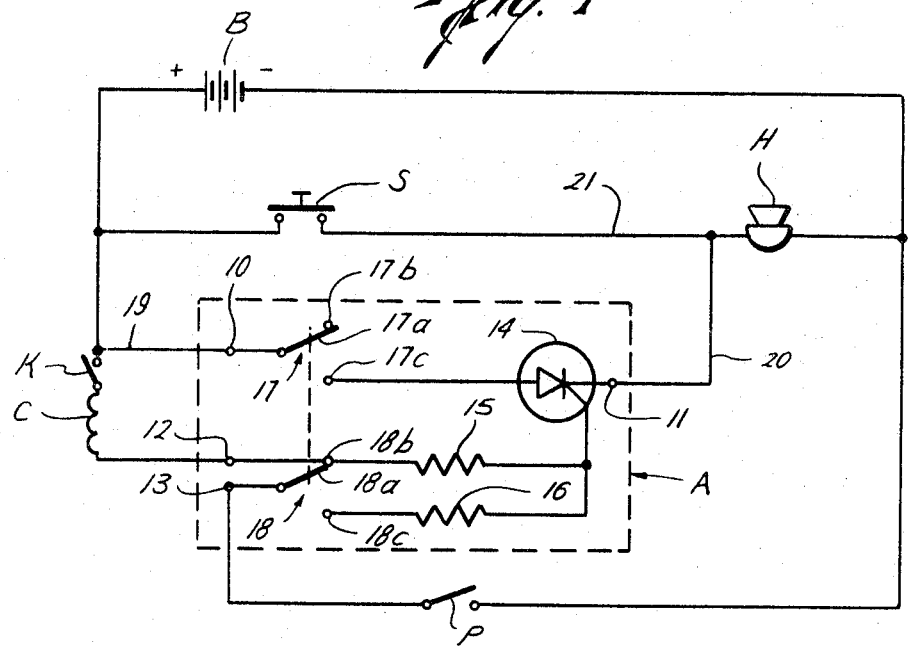
FIG. 1 of the drawing is a schematic illustration of the present invention installed in the electrical system of an internal combustion engine.

With reference to FIG. 1 of the drawings, the preferred form of the circuitry and components of the present invention is enclosed within the confines of the dotted lines as indicated generally at A. Four terminals, 10, 11, 12 and 13 are provided to connect the circuitry of the invention A into the ignition system of a conventional internal combustion engine used to power various vehicles. It should be noted that while the contents of the dotted box A are referred to at times as the invention, it will be undersood that the specific manner of connecting the circuitry and components of the means A both to themselves and to the electrical system of the vehicle forms a part of the present invention.

The circuitry of the invention A includes a silicon-controlled rectifier 14 which acts as a gate means, two fixed resistors 15 and 16 which form a trigger circuit for the rectifier 14, and two ganged switches 17 and 18 which either insert the components of the box A into the electrical system or remove them from the system. The switch 17 includes a movable switch contact 17a and two fixed switch contacts 17b and 17c. Similarly, the switch 18 includes a movable contact 18a and two fixed contacts 18b and 18c.

The terminal 10 of the circuitry of the present invention is connected by an electrical line 19 to the positive post of a battery B. The terminal 11 is connected electrically to a line 20 which in turn is connected to a line 21 extending between a push button switch S and a horn H. The other end of the switch S is connected to the positive pole of the battery B while the other end of the horn H is connected to the negative pole of the battery B. As will be understood, manually closing the switch S energizes the horn H.

A typical ignition coil is illustrated schematically at C. The coil C is connected between an ignition switch K and the terminal 12. The terminal 13 is connected to the points of the ignition system which are illustrated schematically at P. The points P are also connected to the negative pole of the battery B. It will be understood that the circuitry of FIG. 1 is that employed with a negative ground electrical system.

The operation of the circuit illustrated in FIG. 1 of the drawings will now be described. When the vehicle is parked, or left unattended, the ignition switch K is opened, as is customary, to stop the engine. The ganged switches 17 and 18 which are concealed in the vehicle are then moved from the first switching position illustrated in FIG. 1 to the second position. In the second position the movable contacts 17a and 18a engage the fixed contacts 17c and 18c respectively.

If the ignition circuit opened by the switch K is subsequently closed without first moving the switch contacts 17a and 17b into the first position illustrated in FIG. 1, a voltage is applied to the trigger circuit of the silicon-controlled rectifier 14. Thus, the initial current flow through the resistor 16 automatically acts as a triggering pulse at the gate of the silicon-controlled rectifier 14 which biases the diode into conduction. When the diode 14 conducts, current flows in the line 20 to energize the horn H. Once triggered into conduction, the silicon-controlled rectifier 14 continues to conduct for as long as there remains a forward bias across its anode and cathode. This characteristic of the diode 14 prevents the horn H from being deenergized by opening the ignition switch K after the diode has been triggered. To halt the sounding of the horn H, it is necessary to return the switches 17 and 18 to the first position illustrated in FIG. 1 of the drawings.

When the movable contact 18a is engaged with the fixed contact 18c the resistors 15 and 16 are introduced into the ignition circuit. The series resistance of the resistors 15 and 16 drops the voltage delivered to the points P to prevent the fuel in the internal combustion engine associated with the ignition circuit from igniting.

When the switches 17 and 18 are in the position illustrated in FIG. 1 of the drawings, the circuitry of the present invention does not affect the electrical system. Thus, the movable contact 17a is engaged with the open circuit associated with the fixed contact 17b and the movable contact 18a is engaged with the fixed contact 18c which is connected directly to the points P.

From the foregoing description, it will be apparent that the circuit A of the present invention acts to signal an audible alarm in a vehicle and to prevent the engine of the vehicle from being started. Moreover, the horn H continues to sound even though the ignition circuit is re-opened and only resetting the ganged switches 17 and 18 will stop the horn from blowing and permit starting of the engine.

As will be understood by those having ordinary skill in the art, the characterstics and ratings of the silicon-controlled rectifier 14 and the resistance values of the resistors 15 and 16 may be chosen to operate in various electrical systems. In most modern vehicles, a twelve volt system is employed, however, the circuitry of the invention may be modified in a well known manner to operate in a six volt system or in any other higher or lower voltage system. Similarly, the circuitry of the present invention and its manner of connection into the electrical system of the vehicle may be modified to operate in systems other than the negative ground type described herein.

Figure 2:
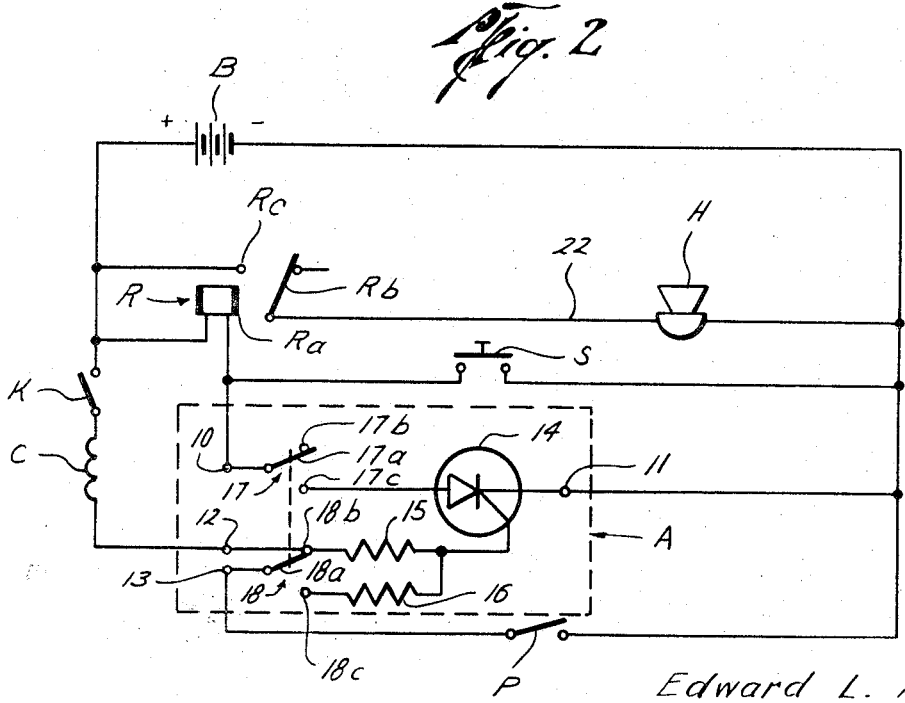
FIG. 2 of the drawing is a schematic illustration of the present invention installed in the electrical system of an internal combustion engine which employs a horn relay.

With reference to FIG. 2 of the drawings, the circuitry of the present invention is illustrated in an electrical system which employs a relay R in the horn circuitry. When the ganged switches 17 and 18 are in the first position illustrated in FIG. 2 of the drawings, the circuitry of A is ineffective as described with respect to FIG. 1. In conventional horn relay system illustrated in FIG. 2, the horn button S, when depressed, allows current to flow through the coil Ra of the relay R which draws a movable switching contact Rb into engagement with the fixed terminal Rc. This allows current to flow in the line 22 which energizes the horn H.

When the switches 17 and 18 have been moved into the second position illustrated in FIG. 2 of the drawings, the circuitry of the invention A acts in the manner described earlier with respect to FIG. 1 with the single exception being that current is allowed to flow through the relay coil Ra when the diode 14 is triggered into conduction.

The components of the invention A which are contained within the dotted lines may be wired together in the manner illustrated in the drawings and thereafter completely potted in any well known manner to provide a small, compact component. The terminals 10, 11, 12 and 13 are preferably exposed externally of the potting material so that they may be connected easily into the electrical system of the vehicle.

The foregoing disclosure and description of the invention is illustrative and explanatory thereof, and various changes in the circuitry and components as well as the details of the illustrated construction may be made within the scope of the appended claims without departing from the spirit of the invention.

I claim:
1. A vehicle theft alarm comprising:
 (a) gate means having triggering means for conducting current through said gate means when an electrical impulse is present in said triggering means;
 (b) switching means for electrically inserting said gate means and said trigger means into the electrical system of a vericle;
 (c) control means included with said switching means for increasing the resistance of the electrical pathway between the coil and the distributor in the electrical system of the vehicle to prevent operation of the engine of said vehicle; and
 (d) means included with said switching means for electrically removing said gate means, said trigger means, and said control means from the electrical systems of said vehicle.

2. The theft alarm of claim 1 wherein said gate means includes a silicon-controlled rectifier and said triggering means includes at least one resistor.

3. The theft alarm of claim 1 wherein:
 (a) said switching means further includes at least a first and a second movable switching contact;
 (b) said first movable switching contact moves between a first and a second fixed switch contact and said second movable switching contact moves between a third and a fourth fixed switch contact; and
 (c) said first and said second movable switch contacts are ganged for similtaneous movement.

4. The theft alarm of claim 3 wherein:
 (a) said first fixed switching contact is connected to an open circuit;
 (b) said second fixed switching contact is connected to the anode of said silicon-controlled rectifier;
 (c) said third fixed switching contact is connected to one end of said one resistor in said triggering means;
 (d) said fourth fixed switching contact is connected to one end of a second resistor in said triggering means;
 (e) the other end of said second resistor is connected to the other end of said first resistor; and
 (f) the gate of said silicon-controlled rectifier is connected to said other end of said first resistor.

5. The theft alarm of claim 2 wherein:
 (a) said silicon-controlled rectifier is connected through said switching means between the horn and the battery of the vechile; and
 (b) said trigger means is connected through said switching means between the ignition coil and the points of the vehicle.

6. The theft alarm of claim 2 wherein:
 (a) the coil of a horn relay is in series with said switching means and said silicon-controlled rectifier; and
 (b) said trigger means is connected through said switching means between the ignition coil and the points of the vehicle.

7. The theft alarm of claim 6 wherein:
 (a) said switching means further includes at least a first and a second movable switching contact;
 (b) said first movable switching contact moves between a first and a second fixed switch contact and said second movable switching contact moves between a third and a fourth fixed switch contact; and
 (c) said first and said second movable switch contacts are ganged for similtaneous movement.

8. The theft alarm of claim 7 wherein:
 (a) said first fixed switching contact is connected to an open circuit;
 (b) said second fixed switching contact is connected to the anode of said silicon-controlled rectifier;
 (c) said third fixed switching contact is connected to one end of said one resistor in said triggering means;
 (d) said fourth fixed switching contact is connected to one end of a second resistor in said triggering means;
 (e) the other end of said second resistor is connected to the other end of said first resistor; and
 (f) the gate of said silicon-controlled rectifier is connected to said other end of said first resistor.

9. The theft alarm of claim 5 wherein:
 (a) said switching means further includes at least a first and a second movable switching contact;
 (b) said first movable switching contact moves between a first and a second fixed switch contact and said second movable switching contact moves between a third and a fourth fixed switch contact; and (c) said first and said second movable switch contacts are ganged for similtaneous movement.

10. The theft alarm of claim 9 wherein:
(a) said first fixed switching contact is connected to an open circuit;
(b) said second fixed switching contact is connected to the anode of said silicon-controlled rectifier;
(c) said third fixed switching contact is connected to to one end of said one resistor in said triggering means;
(d) said fourth fixed switching contact is connected to one end of a second resistor in said triggering means;
(e) the other end of said second resistor is connected to the other end of said first resistor; and
(f) the gate of said silicon-controlled rectifier is connected to said other end of said first resistor.

References Cited
UNITED STATES PATENTS

| | | | |
|---|---|---|---|
| 2,994,073 | 7/1961 | Pelovitz | 340—63UX |
| 3,422,398 | 1/1961 | Rubin | 307—10 |
| 3,464,060 | 8/1969 | Arditti | 340—64 |

ALVIN H. WARING, Primary Examiner

U.S. Cl. X.R.

180—114; 307—10; 340—276